United States Patent
Bowden

(10) Patent No.: US 11,390,319 B2
(45) Date of Patent: Jul. 19, 2022

(54) STEERING SYSTEM WITH SWITCHABLE LOAD REACTION VALVE

(71) Applicant: FEMA Corporation of Michigan, Portage, MI (US)

(72) Inventor: Charles Bowden, Battle Creek, MI (US)

(73) Assignee: FEMA Corporation of Michigan, Portage, MI (US)

( * ) Notice: Subject to any disclaimer, the term of this patent is extended or adjusted under 35 U.S.C. 154(b) by 40 days.

(21) Appl. No.: 16/924,830

(22) Filed: Jul. 9, 2020

(65) Prior Publication Data

US 2021/0009196 A1    Jan. 14, 2021

Related U.S. Application Data

(60) Provisional application No. 62/872,441, filed on Jul. 10, 2019.

(51) Int. Cl.
| | |
|---|---|
| *B62D 5/09* | (2006.01) |
| *B62D 5/093* | (2006.01) |
| *B62D 5/065* | (2006.01) |
| *A01B 69/00* | (2006.01) |

(52) U.S. Cl.
CPC ............ *B62D 5/091* (2013.01); *A01B 69/007* (2013.01); *B62D 5/093* (2013.01); *B62D 5/065* (2013.01)

(58) Field of Classification Search
CPC ........ B62D 5/065; B62D 5/087; B62D 5/091; B62D 5/093; B62D 5/12
USPC ....................................................... 180/403
See application file for complete search history.

(56) References Cited

U.S. PATENT DOCUMENTS

| | | |
|---|---|---|
| 3,952,509 A | 4/1976 | Coleman |
| RE29,252 E | 6/1977 | Miller |
| 4,217,968 A | 8/1980 | Dezelan |
| 4,240,457 A | 12/1980 | Riediger |
| 4,412,415 A | 11/1983 | Thomsen et al. |
| 4,663,936 A | 5/1987 | Morgan |

(Continued)

FOREIGN PATENT DOCUMENTS

| | | |
|---|---|---|
| DE | 3938417 C1 | 3/1991 |
| DE | 102005056039 A1 | 6/2007 |
| WO | WO2015028108 A1 | 3/2015 |

OTHER PUBLICATIONS

Sep. 28, 2020 International Search Report and Written Opinion for PCT/US20/41395.

(Continued)

*Primary Examiner* — Minnah L Seoh
*Assistant Examiner* — Hosam Shabara
(74) *Attorney, Agent, or Firm* — Honigman LLP; Douglas H. Siegel

(57) ABSTRACT

A valve for hydraulic parallel work systems is provided. The valve includes a first pair of ports, a second pair of ports, a first connection, and a second connection. The first connection is between the first pair of ports when the valve is in a load reaction-enabling state. The first connection transmits a load reaction from a load at a steering actuator to a steering device of a hydrostatic steering circuit. The second connection is between the second pair of ports when the valve is in an electro-hydraulic steering enabling state. The second connection fluidly connects a fluid source to an electro-hydraulic steering circuit.

33 Claims, 9 Drawing Sheets

(56) References Cited

U.S. PATENT DOCUMENTS

| | | | |
|---|---|---|---|
| 4,781,219 A | 11/1988 | Haarstad et al. | |
| 4,858,515 A | 8/1989 | Karlberg | |
| 4,942,935 A | 7/1990 | Lech | |
| 5,065,793 A | 11/1991 | Stephenson et al. | |
| 5,101,860 A | 4/1992 | Stephenson | |
| 5,129,424 A | 7/1992 | Stephenson et al. | |
| 5,209,317 A | 5/1993 | Schnelle | |
| 5,413,452 A | 5/1995 | Lech et al. | |
| 5,511,457 A | 4/1996 | Hawkins et al. | |
| 5,826,676 A | 10/1998 | Ko | |
| 6,122,912 A | 9/2000 | Phillips | |
| 6,216,806 B1 | 4/2001 | Toms | |
| 6,490,861 B2 | 12/2002 | Biggi et al. | |
| 6,769,348 B2 | 8/2004 | Hudson et al. | |
| 7,343,934 B2 | 3/2008 | Pride, II et al. | |
| 7,610,935 B2 | 11/2009 | Arbjerg | |
| 7,610,988 B2 | 11/2009 | Porskrog et al. | |
| 7,837,001 B2 | 11/2010 | Young et al. | |
| 7,980,354 B2 | 7/2011 | Thomsen et al. | |
| 7,997,379 B2 | 8/2011 | Kryhlmand et al. | |
| 8,079,439 B2 | 12/2011 | Porskrog et al. | |
| 8,167,081 B2 * | 5/2012 | Byrd | B62D 6/008 180/441 |
| 8,272,471 B2 | 9/2012 | Gehlhoff | |
| 8,651,225 B2 | 2/2014 | Cadman et al. | |
| 9,101,090 B2 | 8/2015 | Pierce et al. | |
| 9,915,276 B2 | 3/2018 | Bruck et al. | |
| 10,001,147 B2 | 6/2018 | Kleitsch | |
| 10,435,064 B2 * | 10/2019 | Krahn | B62D 5/04 |
| 10,668,947 B2 * | 6/2020 | Eagles | B62D 5/093 |
| 10,960,923 B2 * | 3/2021 | Bergmann | B62D 5/093 |
| 2002/0108802 A1 | 8/2002 | Draper | |
| 2003/0051471 A1 | 3/2003 | Draper et al. | |
| 2003/0163989 A1 | 9/2003 | Collet et al. | |
| 2006/0218909 A1 | 10/2006 | Khalil et al. | |
| 2006/0231147 A1 | 10/2006 | Pride, II et al. | |
| 2009/0090882 A1 | 4/2009 | Reilly | |
| 2009/0145501 A1 | 6/2009 | Kiessling et al. | |
| 2009/0218161 A1 | 9/2009 | Cadman et al. | |
| 2009/0272598 A1 * | 11/2009 | Gehlhoff | B62D 1/22 180/442 |
| 2009/0293976 A1 | 12/2009 | Stretch | |
| 2010/0200090 A1 | 8/2010 | Sturman | |
| 2010/0224434 A1 | 9/2010 | Perry et al. | |
| 2013/0087209 A1 | 4/2013 | Krahn | |
| 2014/0138165 A1 | 5/2014 | Bebernes et al. | |
| 2015/0223386 A1 | 8/2015 | Nafziger et al. | |
| 2016/0288827 A1 | 10/2016 | Bebernes et al. | |
| 2017/0072998 A1 | 3/2017 | Krahn | |
| 2018/0186402 A1 | 7/2018 | Irie | |
| 2018/0328420 A1 | 11/2018 | Choi et al. | |

OTHER PUBLICATIONS

Aug. 24, 2020 International Search Report and Written Opinion for PCT/US20/039837.

Feb. 10, 2020 International Search Report and Written Opinion for PCT/US19/56437.

* cited by examiner

STEERING SYSTEM WITH SWITCHABLE LOAD REACTION VALVE

CROSS-REFERENCE TO RELATED APPLICATION

This application claims priority to U.S. Provisional Application Ser. No. 62/872,441, filed Jul. 10, 2019, the disclosure of which is incorporated herein by reference in its entirety.

TECHNICAL FIELD

This disclosure relates to a steering system with a switchable load reaction valve.

BACKGROUND

Hydraulics typically refers to the use of relatively high density incompressible liquids (i.e. hydraulic fluid) to perform work. Hydraulic systems may use an arrangement of one or more hydraulic circuits to perform this work (e.g., moving an object). A hydraulic circuit generally includes components performing operations based on fluid dynamics. Hydraulic circuits often control fluid flow and therefore fluid pressure to perform work either within the circuit or external to the circuit. Some circuits, such as metering circuits, may precisely control flow to influence a speed at which the components perform work. For example, how fast a steering system steers equipment (i.e., a vehicle). A hydraulic circuit may be controlled mechanically and/or electrically (e.g., by electrical signals). As the use of automation becomes increasingly common, hydraulics offers precise control at low speeds as well control of large forces to perform a wide range of functions.

DESCRIPTION OF DRAWINGS

Like reference symbols in the various drawings indicate like elements.

DETAILED DESCRIPTION

Figure 1:
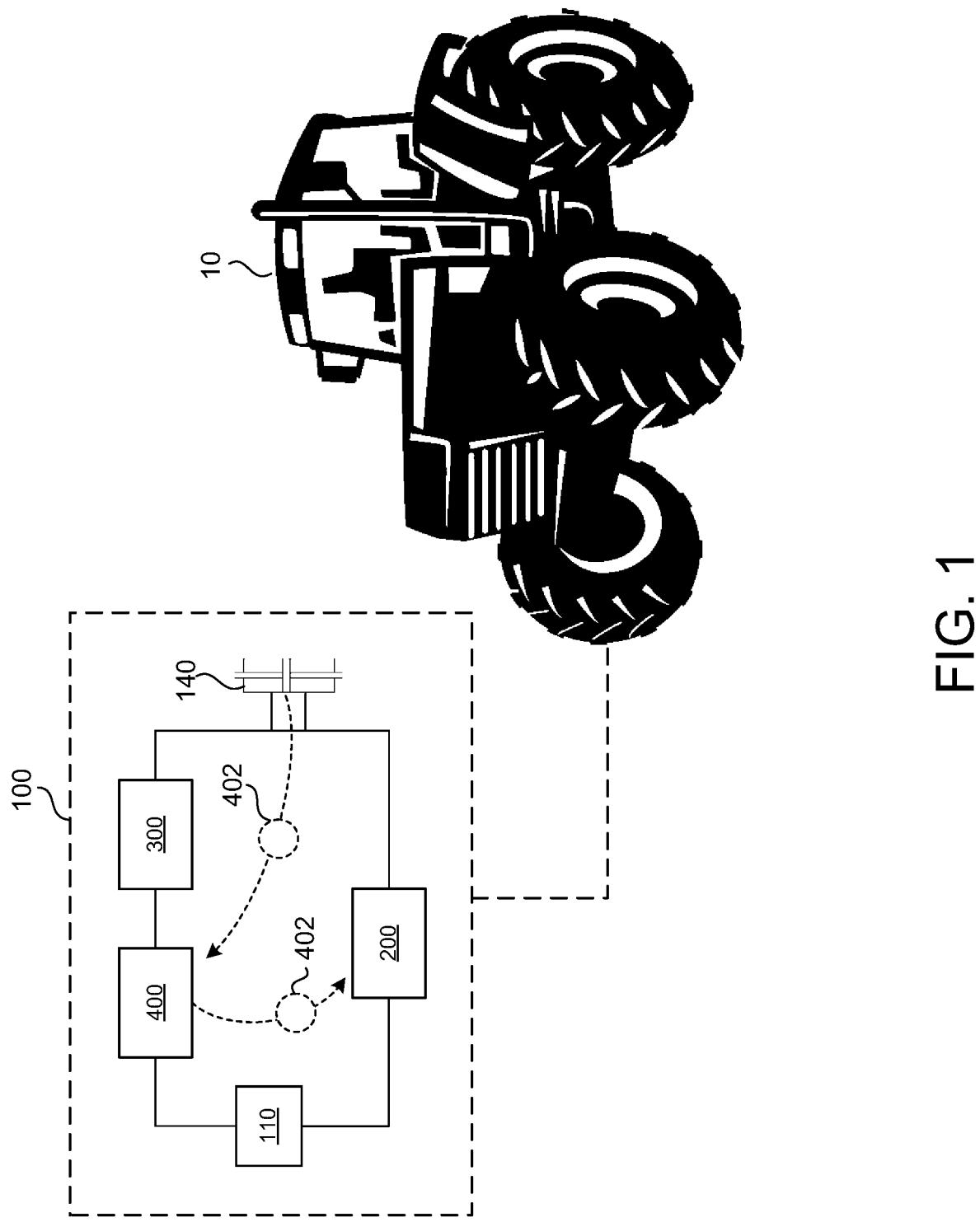
FIG. 1 is a schematic view of an example vehicle implementing a hydraulic work system.

FIG. 1 is an example of a work environment with a hydraulic system 100. Within the work environment, a vehicle 10, such as, for example, a recreational vehicle, a construction vehicle, or an agricultural vehicle, incorporates a hydraulic system 100 to perform one or more functions of the vehicle 10. The hydraulic system 100 includes a fluid supply source 110 (also referred to as a source 110) providing hydraulic fluid to a hydro-static steering circuit 200 (also referred to as an HMU circuit 200) and an electro-hydraulic steering circuit 300 (also referred to as an EMU circuit 300) via a valve system 400. As previously stated, the hydraulic system 100 generally includes components performing operations based on fluid dynamics that may be controlled mechanically and/or electrically (e.g., by electrical signals)

Referring to FIGS. 1, 2, and 3A-3G, the hydraulic system 100 includes the source 110 (e.g., a pump) and a tank 120 in fluid communication with the HMU circuit 200 and the EMU circuit 300. Generally speaking, a pump is a mechanical component that generates fluid energy (i.e. fluid flow governed by fluid velocity) by transferring mechanical energy to a fluid. For example, a motor shaft transfers torque to a pump shaft and generates a fluid velocity. Hydraulic pumps may be hydrodynamic or hydrostatic. A hydrodynamic pump tends to decrease in capacity as a head pressure corresponding to the pump increases (e.g., based on fluid leakage and pressure decay when the pump stops). On the other hand, a hydrostatic pump typically delivers a fixed volume of fluid from its inlet to its outlet regardless of outlet port pressure. The source 110 may refer to a hydrostatic positive displacement type pump where the amount of displacement (e.g., a flow rate such as gallons per minute (gpm)) cannot vary. For example, a particular displacement rate of gallons per minute cannot change unless a drive speed of the pump changes. In some examples, the source 110 is a load sense pump where displacement increases as demand increases.

Since hydraulic systems, such as the hydraulic system 100, are closed systems, hydraulic fluid of the system is often stored and/or returned to a tank, such as the tank 120. The tank 120 generally refers to a low pressure section of the hydraulic system 100 relative to an operating pressure of the source 110. In other words, the tank 120 may be an actual reservoir or an ancillary hydraulic circuit that operates at a lower pressure than the operating pressure.

Figure 3A:
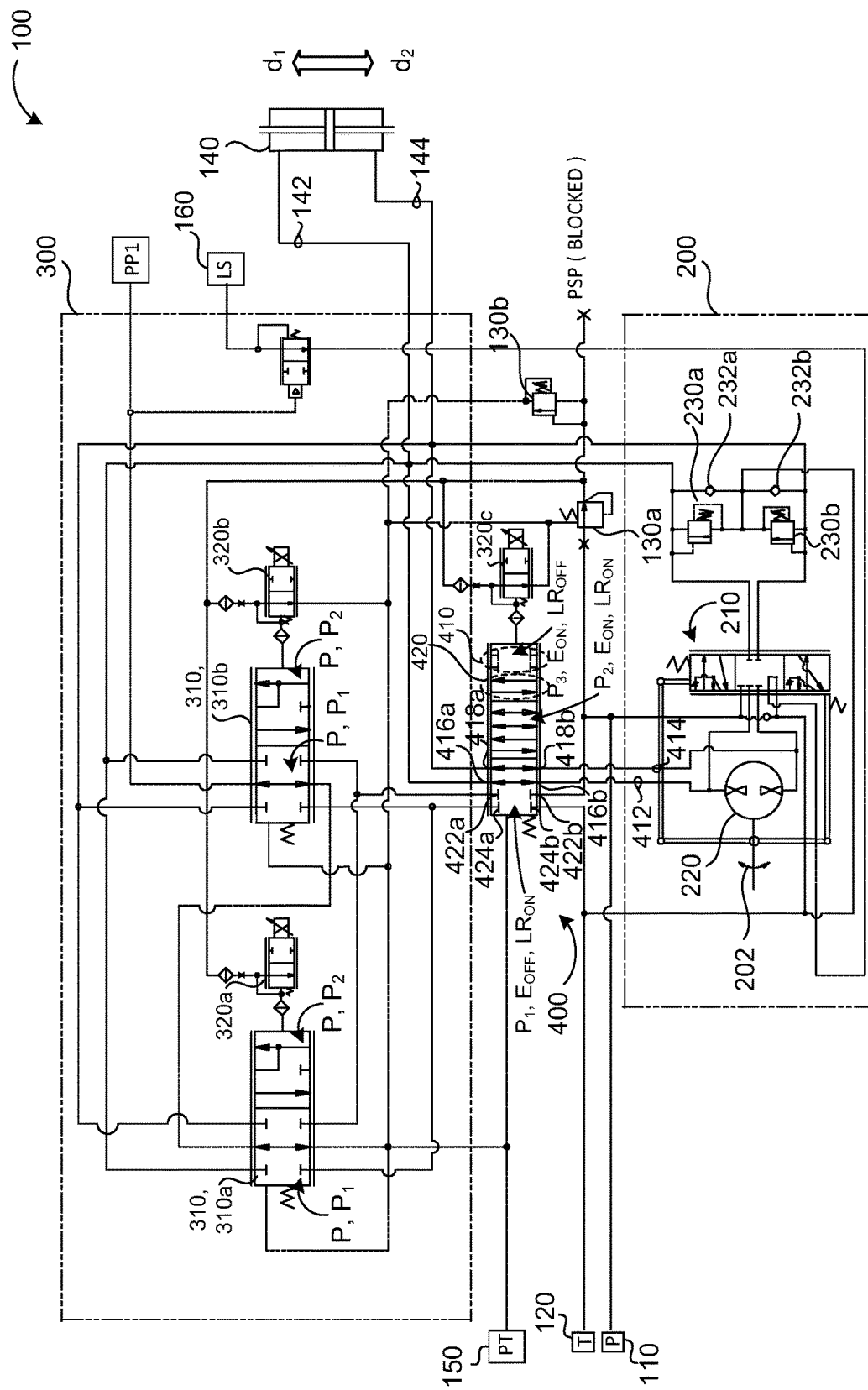
FIGS. 3A-3G are schematic views of example hydraulic systems.

A hydraulic system, such as the hydraulic system 100, may include one or more relief valves 130 (e.g., shown in FIG. 3A). A relief valve may reduce pressure to ensure a consistent pressure or may ensure that overall pressure does not exceed an allowable pressure for components of the hydraulic system 100. For example, the first relief valve 130, 130a is a pressure reducing relief valve that ensures consistent pressure is provided to the pilot operated solenoid valves. FIG. 3A also includes a second relief valve 130, 130b as a pressure relief valve. Here, the second relief valve 130b activates as a pressure regulating device to prevent pressure failure. For example, a failure in the hydraulic system 100 may cause the operating pressure to increase to a pressure that may compromise components within the hydraulic system 100. To prevent this type of failure, a relief valve 130, such as the second valve 130b, may be configured to relieve the pressure to the tank 120 when the relief valve 130 determines that a pressure satisfies a threshold level of pressure. For example, the threshold level of pressure may correspond to a level of pressure that exceeds a spring tension of the system relief valve 130 and biases the spring of the system relief valve 130 to permit flow to the tank 120.

Optionally, the hydraulic system 100 includes a pilot tank 150 (e.g., shown in FIG. 3A). The pilot tank 150 may be implemented in the hydraulic system 100 because some components of the hydraulic system 100 cannot function with a normal pressure that a tank provides. In other words, connecting these components to the tank 120 may cause pressure issues in the hydraulic system 100. For example, certain hydraulic components may need a lower pressure than the tank 120 and thus, require the pilot tank 150. In the examples shown, FIG. 3A illustrates a hydraulic system 100 with the pilot tank 150 (e.g., coupled to a valve system 400) by pilot lines shown as equal-segmented dotted lines to and from components of the hydraulic system 100. Although other examples in FIGS. 2 and 3A-3G do not show hydraulic systems 100 with a pilot tank 150, these hydraulic systems 100 may be configured to include a pilot tank 150.

In some examples, the hydraulic system 100 includes a load sense feature 160 (e.g., shown in FIGS. 2 and 3A-3G). The load sense feature 160 includes a load sense signal line 162 that the load sense feature 160 uses to sense hydraulic pressure within the hydraulic system 100. In some examples, the load sense feature 160 works in conjunction with the source 110 to maintain a hydraulic pressure above a hydraulic pressure threshold for a given work task (e.g., steering with a cylinder 140). Therefore, the load sense feature 160 senses the pressure from the signal line 162 to provide the load sense feature 160 with an indication of the hydraulic pressure across a portion of the hydraulic system 100. By monitoring a portion of the hydraulic system 100, the load sense feature 160 may ensure that the source 110 supplies enough hydraulic fluid to the hydraulic system 100 for the given work task. For instance, FIGS. 2 and 3A-3G illustrate that the load sense feature 160 of the hydraulic system 100 has a load sense signal line 162 that monitors the hydraulic pressure at a steering valve 210 of the HMU circuit 200 to ensure there is enough hydraulic pressure to steer the vehicle 10. In some examples, the load sense signal line 162 includes a restrictor, such as an orifice, as a structure to indicate a pressure change to the load sense feature 160.

Referring further to FIGS. 1, 2, and 3A-3G, the hydraulic system 100, via the operation of the HMU circuit 200 and/or the EMU circuit 300, operates one or more hydraulic cylinders 140 to perform work. For example, when the hydraulic system 100 corresponds to a steering system, the one or more hydraulic cylinders 140 (also referred to as a steering actuator or a hydraulic actuator) perform the work of steering a vehicle (e.g., the vehicle 10 of FIG. 1). The one or more hydraulic cylinders 140 may correspond to any type of cylinder utilizing hydraulic fluid. Some examples of cylinders include single acting cylinders, double acting cylinders, rodless cylinders, etc. For example, in a simple steering system, a front axle of a steering system may be driven by two single acting cylinders (e.g., one for each front wheel) or a double acting cylinder (e.g., tied together by tie rods of a rack and pinion to jointly operate the front wheels). In FIGS. 2 and 3A-3G, the hydraulic system 100 operates a double acting cylinder 140 where a first fluid line 142 is configured to supply hydraulic fluid to extend a piston in a first direction $d_1$ and a second fluid line 144 is configured to supply hydraulic fluid to extend the piston of the cylinder 140 in a second direction $d_2$ opposite the first direction $d_1$. In the case of a steering hydraulic system (e.g., FIG. 1), the extension of the piston within the cylinder 140 pivots or turns the wheels of the vehicle 10 for steering the vehicle 10.

Figure 2:
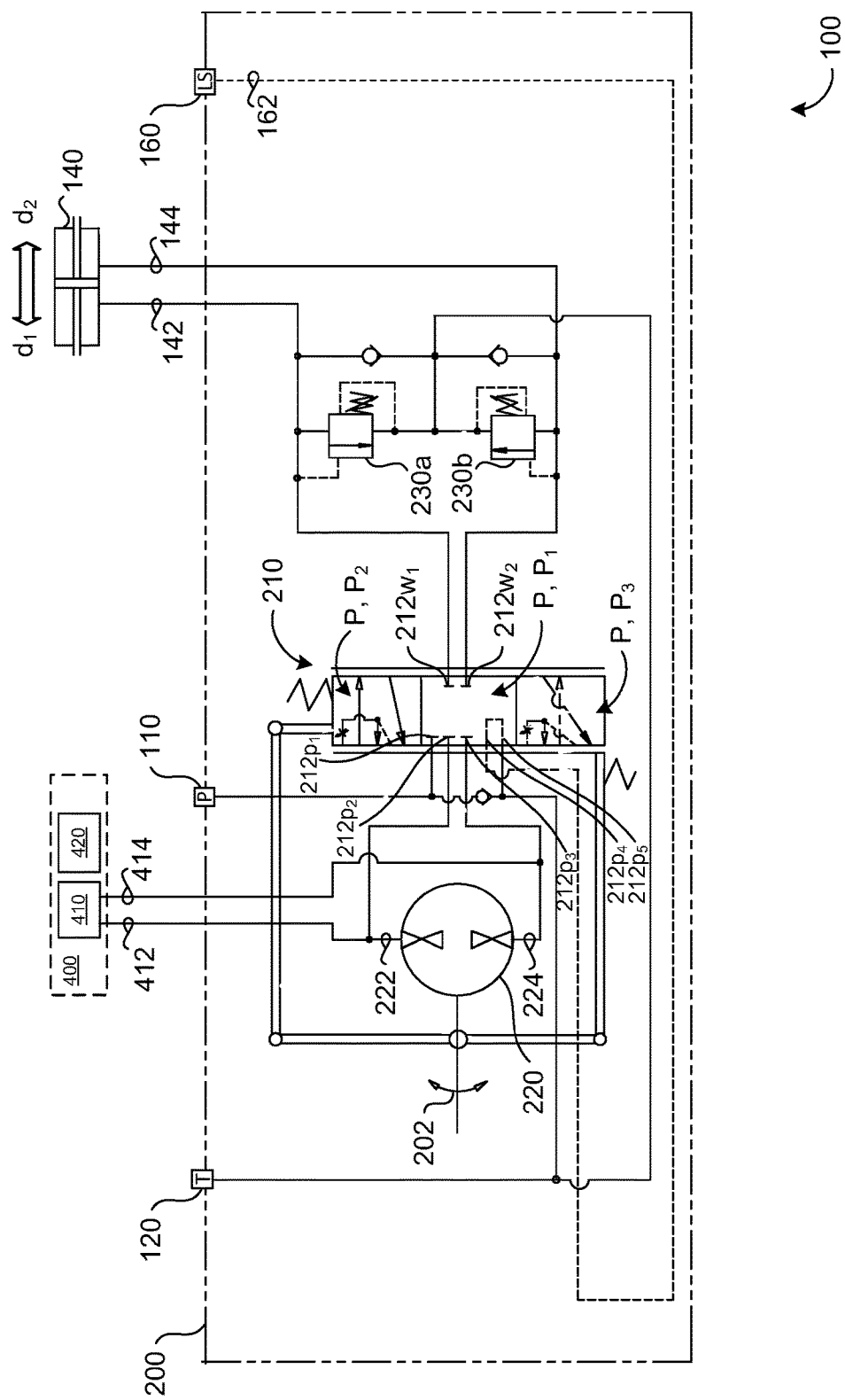
FIG. 2 is a schematic view of an example hydrostatic steering circuit for the hydraulic work system.

Referring to FIGS. 2 and 3A-3G, but more specifically FIG. 2, the HMU circuit 200 refers to a hydraulic circuit configured to meter hydraulic fluid to the cylinder 140 (e.g., manually meter hydraulic fluid). In some examples, the HMU circuit 200 is configured to receive a manual steering input 202 (shown as a curved line with an arrowhead on each end); and, based on the manual steering input 202, the HMU circuit 200 meters hydraulic fluid to the cylinder(s) 140. For instance, the manual steering input 202 includes an operator of the vehicle 10 turning a steering wheel. In some examples, the HMU circuit 200 includes the steering valve 210 (e.g., a proportional spool valve) and a fluid metering unit 220 (e.g., a bi-directional pump such as a gerotor). In these examples, when the HMU circuit 200 receives the manual steering input 202, a steering input rate of the input 202 shifts the steering valve 210 to a position P that provides the hydraulic fluid to a working port $212w$ ($212w_1$, $212w_2$) in fluid communication with the cylinder 140. For example, as shown in FIG. 2, a first working port $212w_1$ is connected to the first fluid line 142 while a second working port $212w_2$ is connected to the second fluid line 144. Hydraulic fluid from either working port $212w$ may drive the piston of the cylinder 140 to perform work steering the vehicle 10. When the steering wheel is turned faster, the steering valve 210 moves further from a neutral (i.e. center) position $P_N$, $P_1$ based on the increased rate of input rotation. When the steering valve 210 translates further from the center position $P_N$, $P_1$, the steering valve 210 may supply more hydraulic fluid to drive the cylinder 140 and thus perform a faster turn for the vehicle 10. The fluid rate from the fluid metering unit 220 and position P of steering valve 210 are directly related to the steering input rate.

Optionally, the HMU circuit 200 includes one or more cylinder port reliefs 230 (230a, 230b). As shown in FIGS. 2 and 3A-3G, the HMU circuit 200 includes two cylinder port reliefs 230a, 230b each connected to a working port $212w$ of the steering valve 210. Much like the system relief valve 130, the cylinder port relief 230 is a pressure regulating device in case an undesirable pressure occurs at the cylinder(s) 140. For example, when the piston of the cylinder 140 is driven to a top dead center position and more hydraulic fluid is provided to continue driving the piston in the direction of the top dead center position, the cylinder 140 may experience a catastrophic failure due to increased pressure from the additional hydraulic fluid. To prevent these types of failures, the cylinder port relief 230 may be set to relieve a pressure exceeding a pressure threshold for the cylinder 140. For instance, the cylinder port relief 230 may determine that the pressure at the cylinder 140 exceeds the pressure threshold for the cylinder 140 and then relieve the pressure exceeding the pressure threshold by providing hydraulic fluid to counteract the pressure. In some configurations, in addition to a cylinder port relief 230, the HMU circuit 200 includes a check valve 232 operating between the steering valve 210 and the cylinder 140. For instance, the HMU circuit 200 includes a check valve 232, 232a-b for each fluid line connected to the cylinder 140.

In some examples, the steering valve 210 of the HMU circuit 200 has multiple positions P. Each position P of the steering valve 210 enables the steering valve 210 to have different functionality with respect to the cylinder 140, and/or other component(s) of the hydraulic system 100. Although, as a proportional spool valve, the steering valve 210 may have an infinite number of positions along its length, FIGS. 2 and 3A-3G schematically represent the steering valve 210 by a few dominant positions P to illustrate its functionality. Here, FIGS. 2 and 3A-3G illustrate the steering valve 210 with three positions P, $P_{1-3}$. The first position P, $P_1$ corresponds to a neutral position $P_1$ where the working ports $212w$ of the steering valve 210 are closed (i.e., without a connection to any other ports 212 within the steering valve 210). The neutral position $P_1$ generally refers to a default position (also referred to as a centering position) of the steering valve 210 because the structure of the steering valve 210 is configured to revert to this neutral position $P_1$ when the HMU circuit 200 lacks a steering input 202. In other words, the steering valve 210 biases to the neutral position $P_N$ (e.g., shown as biased by a spring force) when the steering valve 210 is not receiving a steering input 202. In each of the second position P, $P_2$ and the third position P, $P_3$ of the steering valve 210, the fluid metering unit 220 is fluidly connected to a working port $212w$ of the steering valve 210 and able to provide hydraulic fluid to the cylinder 140. For instance, these positions $P_2$, $P_3$ steer the vehicle 10 left and right according to a steering input 202. In FIG. 2, a second port $212p_2$ that is connected to the fluid metering unit 220 by a first fluid line 222 is also fluidly connected to the first working port $212w_1$ while a third port $212p_3$ that is connected to the directional pump 220 by a second fluid line 224 is also fluidly connected to the second working port 212$w_2$.

In some implementations, the steering valve 210 is a 7-way valve. As a 7-way valve, the steering valve 210 has seven ports 212. For example, in FIG. 2, the steering valve 210 has two working ports 212$w_{1-2}$ and five other ports 212$p_{1-5}$. The first port 212$p_1$ is connected to the source 110 as a hydraulic fluid supply connection. The second port 212$p_2$ and the third port 212$p_3$ connect to the fluid metering unit 220 at the first fluid line 222 and the second fluid line 224 respectively. Here, the fourth port 212$p_4$ is a load sensing port that is part of the load sense feature 160 such that the fourth port 212$p_4$ connects to the load sense signal line 162. This load sensing port (i.e., the fourth port 212$p_4$) may be optional in some configurations as a means to ensure that proper hydraulic pressure is supplied adequately across the steering valve 210 to drive the cylinders 140. The fifth port 212$p_5$ connects to the tank 120 and is configured to exhaust hydraulic fluid from the steering valve 210. In the first position $P_1$ (i.e., neutral position $P_1$), each port 212 is closed except for an open loop between the fourth port 212$p_4$ and the fifth port 212$p_5$.

When the steering valve 210 receives a steering input 202 that shifts the steering valve 210 to the second position $P_2$, the ports 212 interconnect allowing hydraulic fluid to flow to the cylinder 140. For example, the first port 212$p_1$ fluidly connects to the third port 212$p_3$ such that the source 110 provides hydraulic fluid to the fluid metering unit 220 (e.g., via the second fluid line 224) while the fourth port 212$p_4$ monitors this supply of hydraulic fluid (via the load sense signal line 162 to the load sense feature 160). The second working port 212$w_2$ fluidly connects to the fifth port 212$p_5$ such that the second fluid line 144 of the cylinder 140 connects to tank 120. In this position $P_2$, the fluid metering unit 220 provides hydraulic fluid by way of the first fluid line 222 to the cylinder 140 by a connection between the second port 212$p_2$ and the first working port 212$w_1$. In some examples, the connection between the first port 212$p_1$ and the third port 212$p_3$ includes a restrictor (e.g., an orifice).

When the steering valve 210 receives a steering input 202 that shifts the steering valve 210 to the third position $P_3$, the ports 212 interconnect in a manner different from the second position $P_2$ that also allows hydraulic fluid to flow to the cylinder 140. In third position $P_3$, the first port 212$p_1$ fluidly connects to the second port 212$p_2$ such that the source 110 provides hydraulic fluid to the fluid metering unit 220 (e.g., via the first fluid line 222) while the fourth port 212$p_4$ monitors this supply of hydraulic fluid (via the load sense signal line 162 to the load sense feature 160). The first working port 212$w_1$ fluidly connects to the fifth port 212$p_5$ such that the first fluid line 142 of the cylinder 140 connects to tank 120. In this position $P_2$, the fluid metering unit 220 provides hydraulic fluid by way of the second fluid line 224 to the cylinder 140 by a connection between the third port 212$p_3$ and the second working port 212$w_2$. In some examples, the connection between the first port 212$p_1$ and the second port 212$p_3$ includes a restrictor (e.g., an orifice).

Regardless of the position P of the steering valve 210, the valve system 400 connects to the HMU circuit 200 between the steering valve 210 and the fluid metering unit 220. For instance, FIGS. 2 and 3A-3G depict a first valve system line 412 and a second valve system line 414 of a load reaction section 410 of the valve system 400. The first valve system line 412 connects (e.g., directly connects) to the first fluid line 222 of the fluid metering unit 220 and the second valve system line 414 connects (e.g., directly connects) to the second fluid line 224 of the fluid metering unit 220. Each of the first valve system line 412 and the second valve system line 414 allows the HMU circuit 200 to sense a load at the cylinder 140. In other words, the valve system lines 412, 414 provide feedback to a steering input device (e.g., a steering wheel or joystick) such that the steering input device receives a load reaction 402 (as feedback) from a load at the cylinder 140. For instance, while driving the vehicle 10, if the vehicle 10 hits a rock or another obstacle causing a load to act against the cylinder 140, the lines 412, 414 are configured via the valve system 400 to sense that load and supply a load reaction 402 to the HMU circuit 200 (e.g., as broadly illustrated in FIG. 1). This load reaction 402 may occur regardless of the position P of the steering valve 210 because each line 412, 414 is located prior to the steering valve 210 (e.g., between the steering valve 210 and the fluid metering unit 220 at fluid lines 222, 224). More particularly, this configuration allows the load reaction 402 to be provided to the HMU circuit 200 (e.g., at the steering input device) without further complicating the ports 212 of the steering valve 210 (e.g., without requiring additional connections in various positions P of the steering valve or needing additional ports 212 at the steering valve 210).

Referring to FIGS. 3A-3G, the EMU circuit 300 generally refers to a hydraulic circuit in fluid communication with the source 110 that, much like the HMU circuit 200, is configured to provide hydraulic fluid to perform work for the vehicle 10. In some examples, the EMU circuit 300 is a guided steering circuit (e.g., such as a global positioning-guided system (GPS) steering circuit) that includes one or more steering valves 310. Generally speaking, as an electro-hydraulic steering circuit 300, each steering valve 310 may be electronically activated (e.g., by a solenoid or a pilot operated solenoid). For instance, any of the hydraulic circuit configurations illustrated in FIGS. 3A-3G may have steering valve(s) 310 operated by a solenoid or a pilot operated solenoid valve 320 even though only FIG. 3A depicts a configuration with pilot operated solenoid valve(s) 320a-c. Because both the HMU circuit 200 and the EMU circuit 300 may provide hydraulic fluid to perform a given work task, the HMU circuit 200 and the EMU circuit are parallel circuits such that the EMU circuit 300 is in a parallel fluid connection with the HMU circuit 200. In some examples, circuits 200, 300 are parallel circuits that share common hydraulic components (e.g., they share the source 110 and the tank 120).

As shown by FIGS. 3A-3G, the EMU circuit 300 includes a first steering valve 310a and a second steering valve 310b. Here, each steering valve 310 is configured to supply hydraulic fluid to the cylinder 140 (e.g., via a fluid connection to the first fluid line 142 or the second fluid line 144). With two steering valves 310a-b, one steering valve 310 may provide hydraulic fluid to the first fluid line 142 (e.g., to actuate the cylinder 140 in a first direction $d_1$) while the other steering valve 310 provides hydraulic fluid to the second fluid line 144 (e.g., to actuate the cylinder 140 in a second direction $d_2$), or vice versa. In some implementations, each steering valve 310 is a proportional spool valve. For instance, each steering valve 310 is a two-position proportional spool valve (e.g., a 2-position, 6-way proportional spool valve). As a two-position valve, the steering valve 310 may include a first position P, $P_1$ with closed ports (e.g., disconnected from fluid communication with fluid lines 142, 144 to the cylinder 140) and a second position P, $P_2$ where a pair of ports have a fluid connection allowing hydraulic fluid to be supplied to the cylinder 140 (e.g., from the source 110). In some examples, the EMU circuit 300 includes only a single steering valve 310 with multiple positions P to actuate the cylinder 140 in one or more directions d. Here, for simplicity, FIGS. 3A-3G depict two steering valves 310a-b where each valve 310 is configured to actuate the double-acting cylinder 140 in a given direction d.

In some configurations, the EMU circuit 300 includes a pressure gage PP1 that monitors hydraulic pressure at particular components of the EMU circuit 300. For instance, the pressure gage PP1 monitors hydraulic pressure in one or more steering valves 310. In FIGS. 3A-3G, the pressure gage PP1 and the lines corresponding to the pressure gage PP1 are shown in dotted lines. In the case of a pilot operated system with a pilot tank 150 and/or pilot operated solenoid valves 320, the pilot lines of the EMU circuit 300 are also shown as dotted lines similar to the pressure gage lines (e.g., as shown in FIG. 3A). With pilot operated solenoid valves 320, the steering valve(s) 310 move between positions P in response to some combination of hydraulic fluid from the pilot lines and an electronic signal. In other examples, such as shown in FIGS. 3B-3G, solenoids operated by electronic signal(s) move the steering valve(s) 310 between positions P.

Figure 3B:
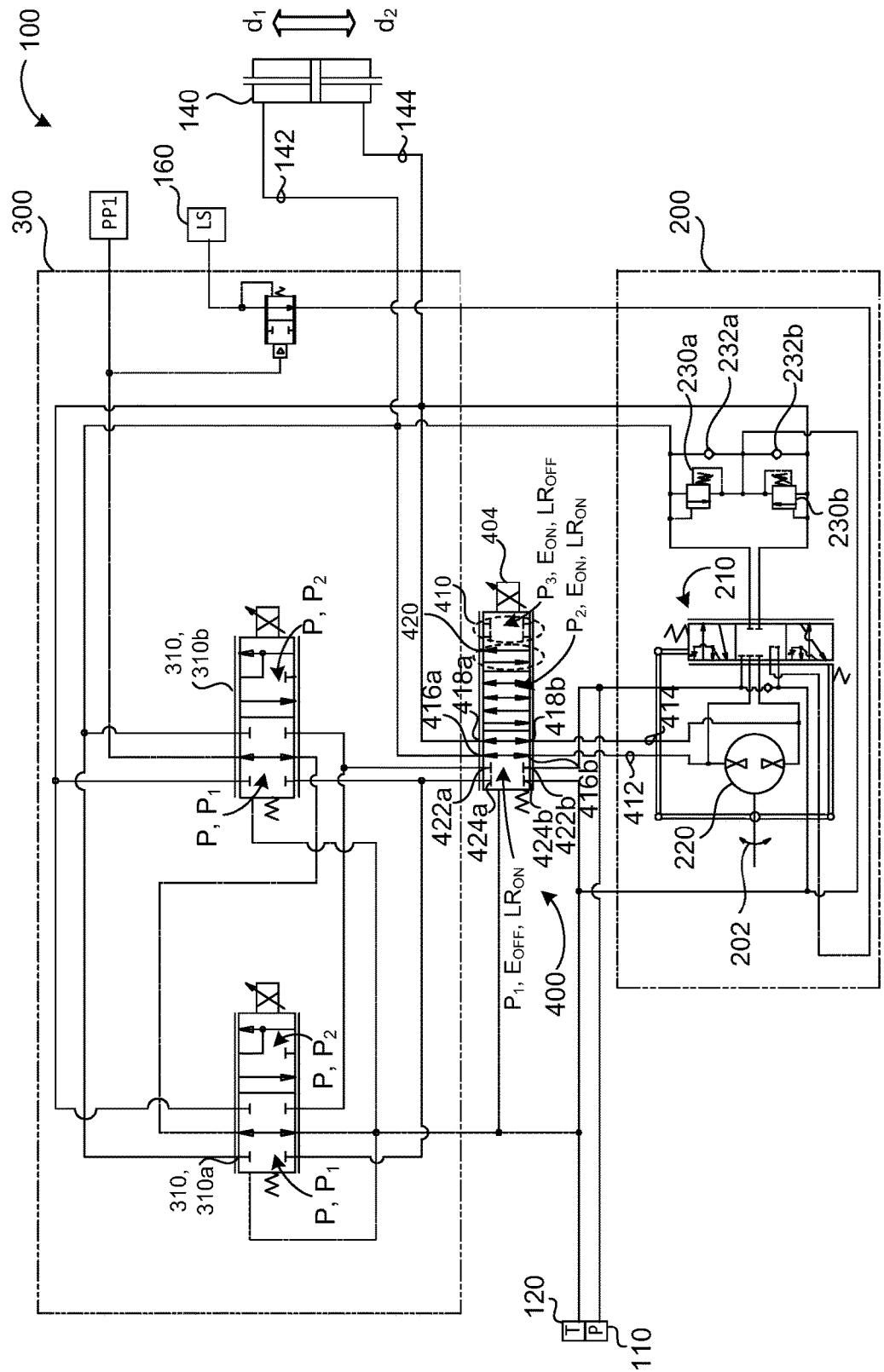
Figure 3C:
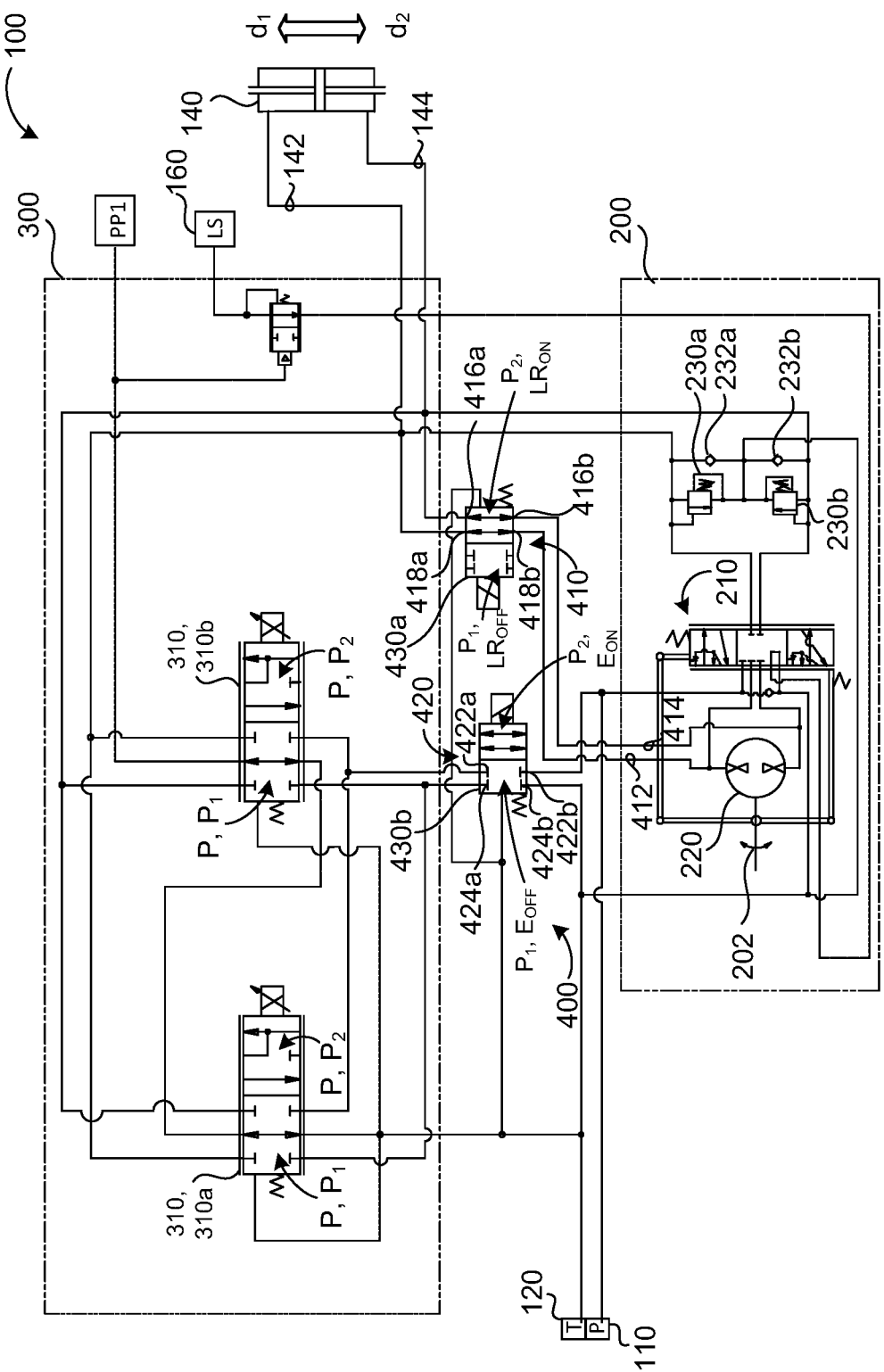
Figure 3D:
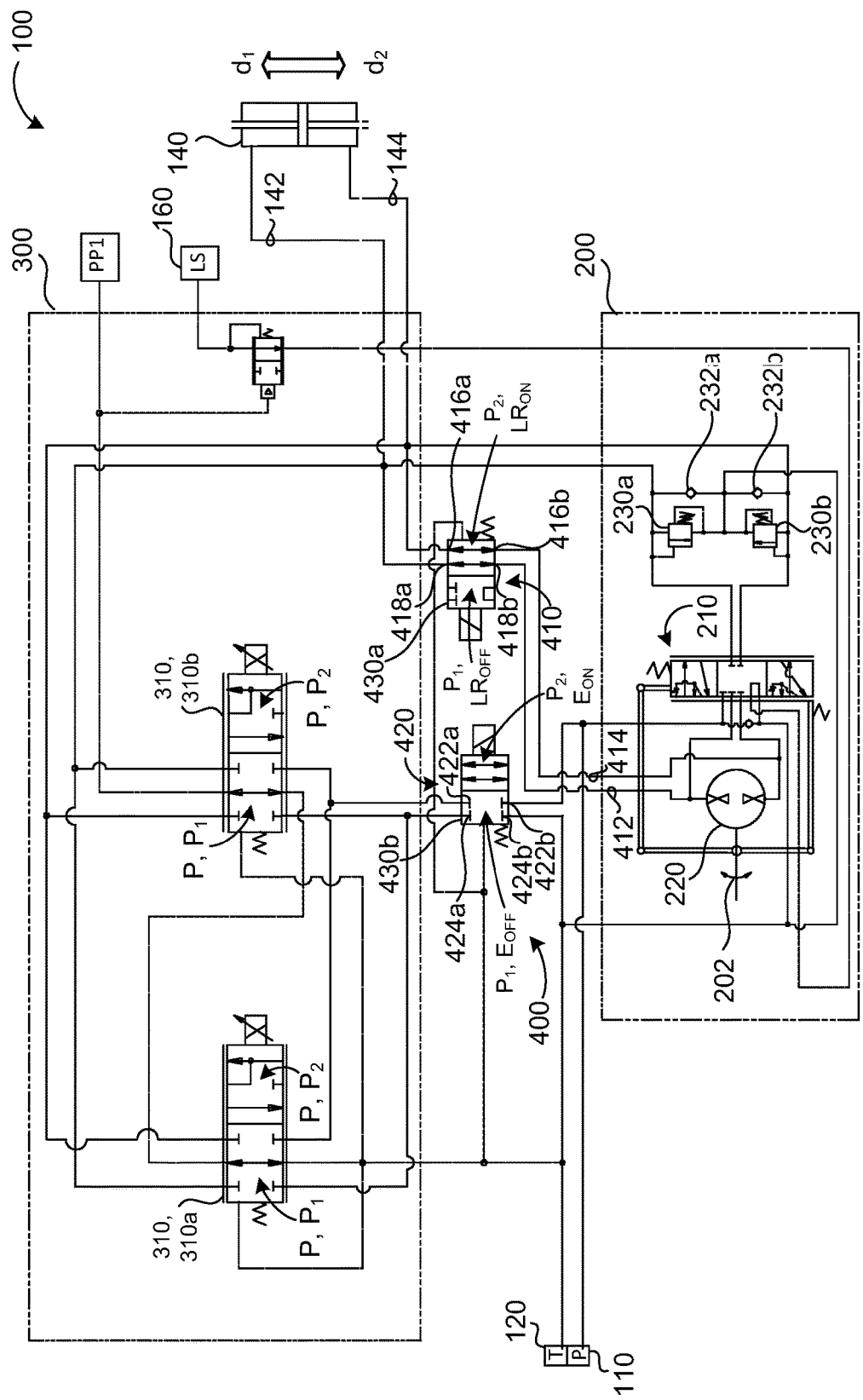
Figure 3E:
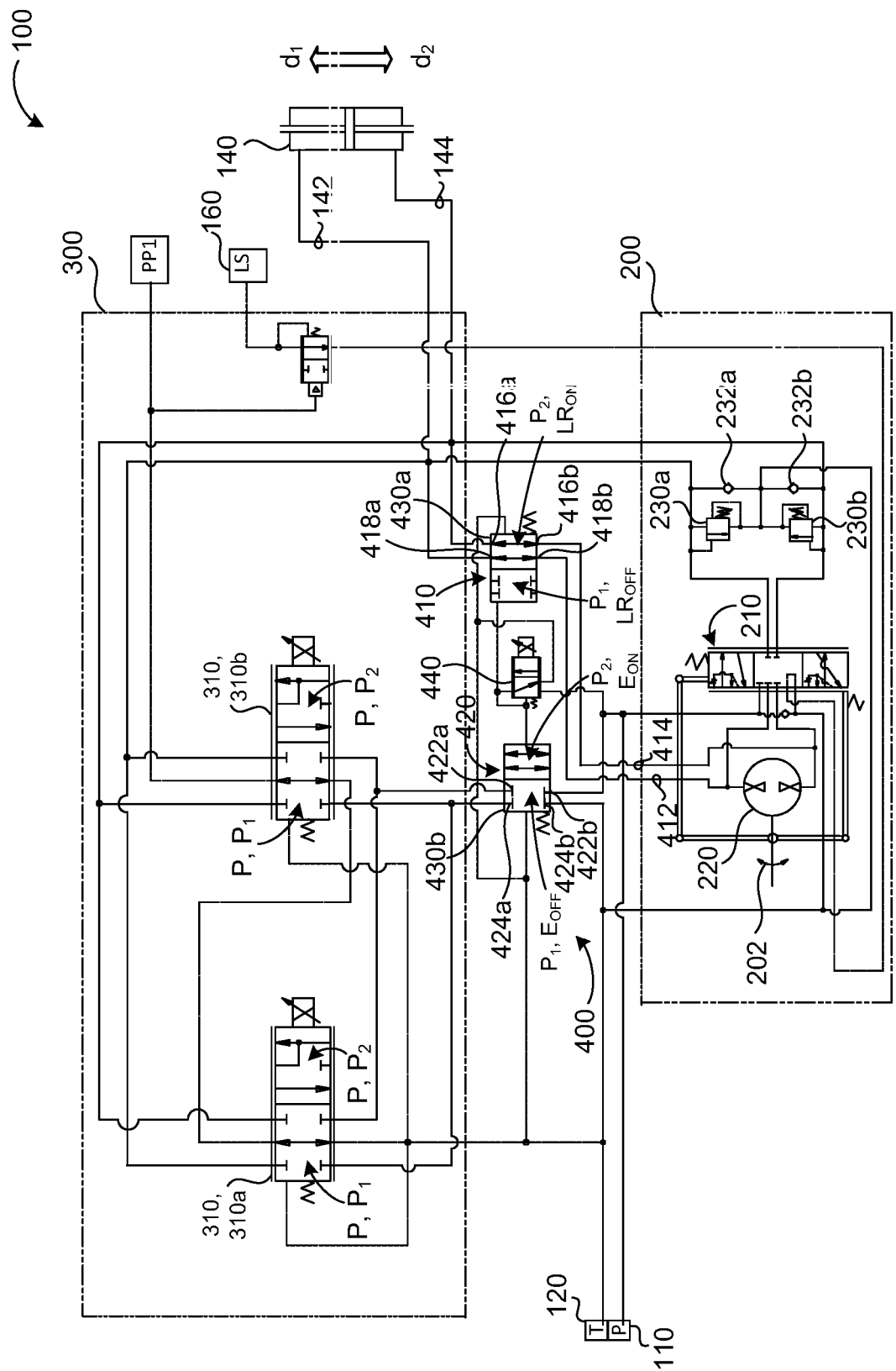
Figure 3F:
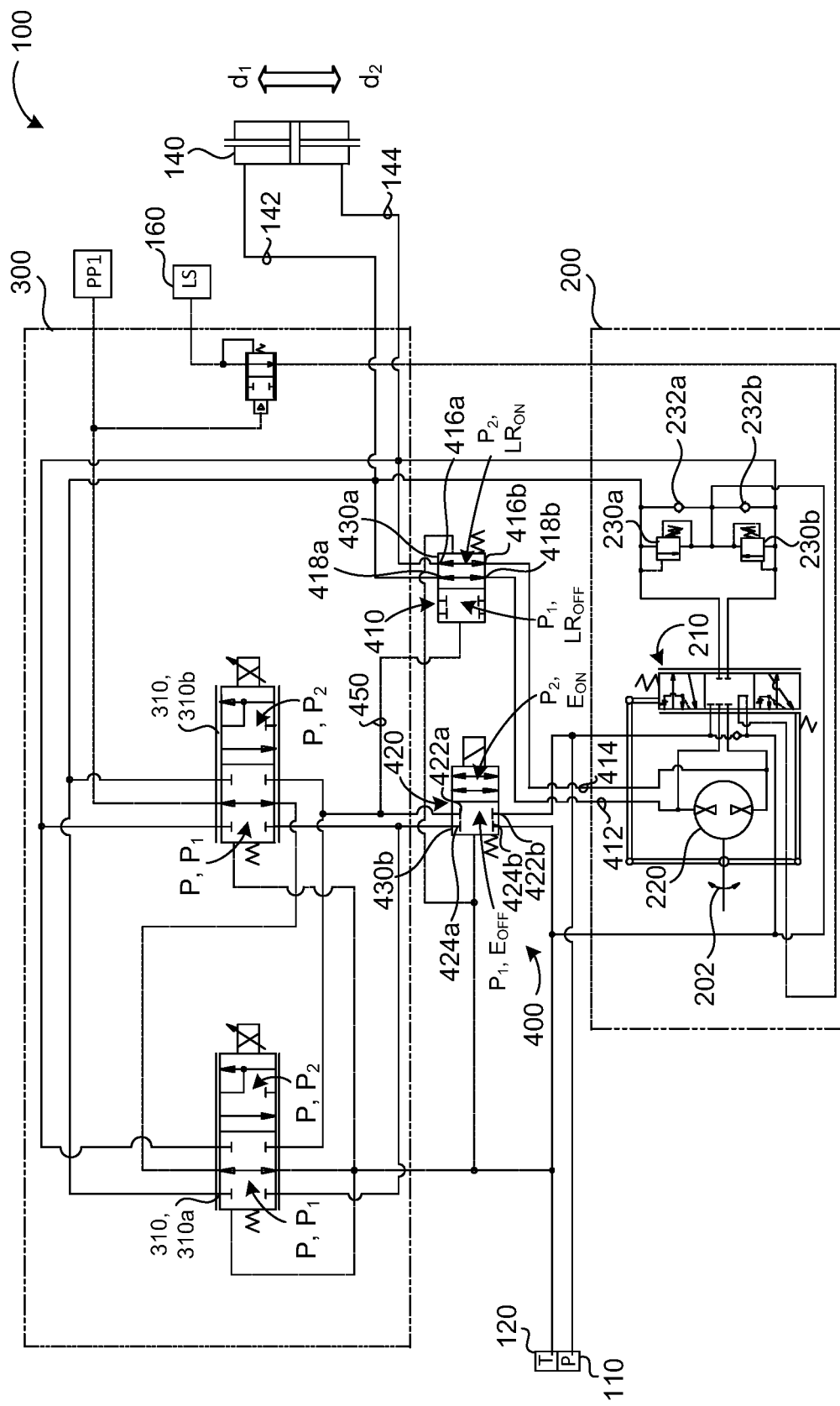
Figure 3G:
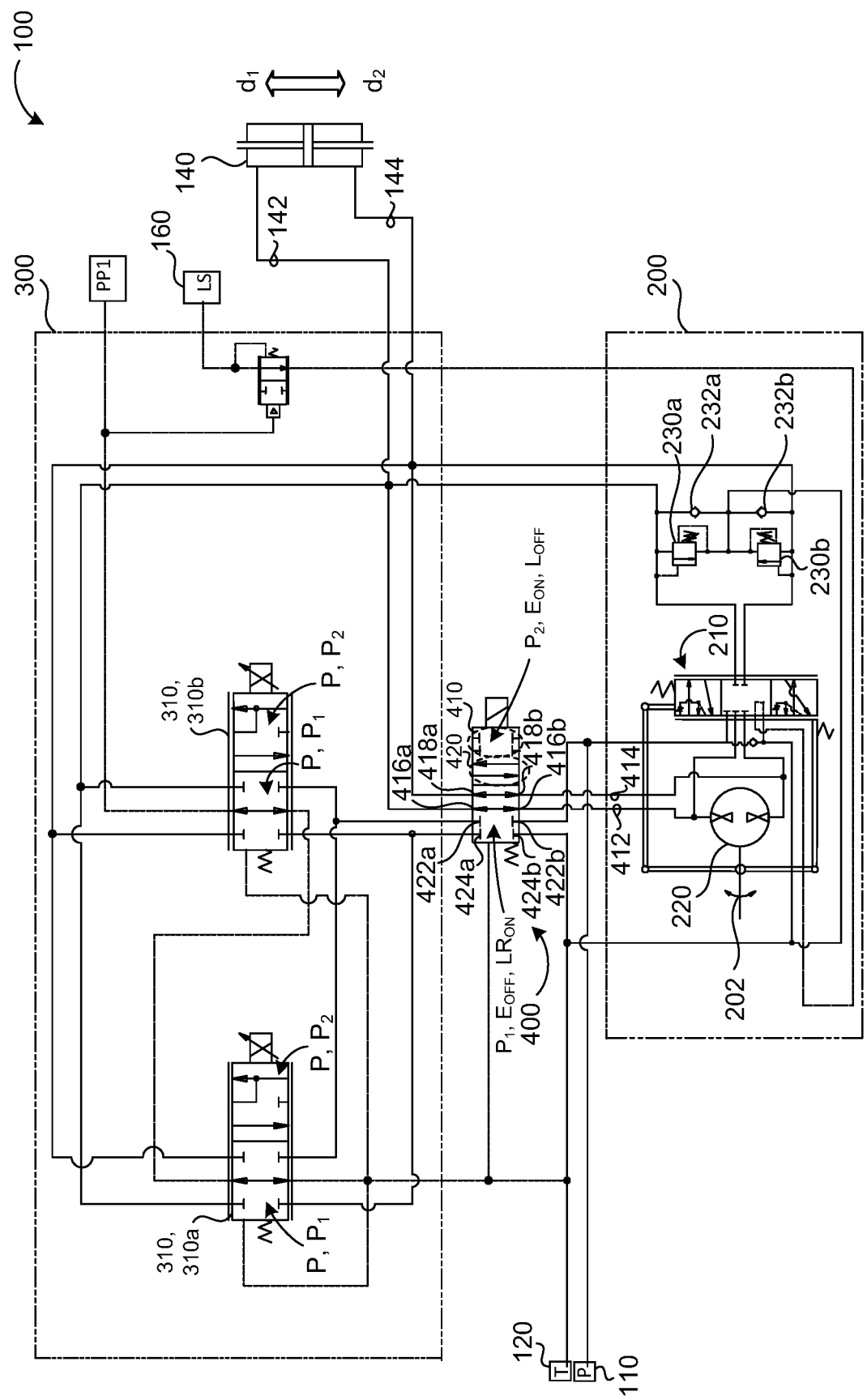

Referring further to FIGS. 1, 2, and 3A-3G, the hydraulic system 100 includes the valve system 400. The valve system 400 is a valve configuration that functions to enable/disable the EMU circuit 300 as well as provide the load reaction 402 to the HMU circuit 200 (e.g., to the steering input device of the HMU circuit 200 by connections to the fluid metering device 220). The valve system 400 may include one or more valves to perform these functions. For instance, FIGS. 3A, 3B, and 3G depict the valve system 400 as a single, multi-position valve; while in other examples, FIGS. 3C-3F depict the valve system 400 as more than one valve. In either arrangement, the valve system 400 includes a load reaction section 410 and an electro-hydraulic steering switching section 420 (also referred to as an EMU switching section). FIGS. 3A, 3B, and 3G indicate the load reaction section 410 and the EMU switching section 420 with dotted ovals; while in FIGS. 3C-3F the load reaction section 410 and the EMU switching section 420 are indicated by arrows. Although the dotted ovals are shown in the third position $P_3$, this is merely illustrative and the load reaction section 410 and the EMU switching section 420 may be similarly located in each valve position P.

The load reaction section 410 is configured to be ON (i.e., a load reaction enabling position $LR_{ON}$) or OFF (i.e., a load reaction disabled position $LR_{OFF}$) depending on a desired performance for the hydraulic system 100. In other words, an operator of the vehicle 10 may or may not want load reaction capability when using the EMU circuit 300. For example, an operator of an agricultural vehicle 10 may want load reaction capability (i.e., the load reaction section 410 in the ON state) while driving down a road or a highway, but may not want the load reaction capability when the vehicle 10 is operating in the field. In some examples, the load reaction section 410 is configured to be always ON when the operator is providing steering inputs 202 to the HMU circuit 200.

The load reaction section 410 includes a first pair of ports 416, 416a-b. When the load reaction section 410 is in the ON state $LR_{ON}$, the valve system 400 forms a first connection between the first pair of ports 416a-b. With the first connection, the valve system 400 may transmit a load reaction 402 from a load sensed at the cylinder 140 to the HMU circuit 200 (e.g., the fluid metering device 220). Here, as shown in FIGS. 3A-3G, when the valve system 400 is in the ON state $LR_{ON}$, the first connection between the first pair of ports 416a-b connects at least one of the first fluid line 142 or the second fluid line 144 of the cylinder 140 to at least one of the first valve system line 412 or the second valve system line 414. By connecting the fluid line(s) 142, 144 to the valve system line(s) 412, 414, the cylinder 140 is fluidly connected to the fluid metering device 220. In some examples, such as FIGS. 3A and 3B with a double-acting cylinder 140, the load reaction section 410 includes a second pair of ports 418, 418a-b where, when the valve system 400 is in the ON state $LR_{ON}$, a second connection is formed between the second pair of ports 418a-b. In these examples, the first connection may provide feedback for load in a first direction $d_1$ against the cylinder 140 (e.g., that impacts the first fluid line 142) while the second connection provides feedback for a load in a second direction $d_2$ against the cylinder 140 (e.g., that impacts the second fluid line 144). Conversely, when the valve system is in the OFF state $LR_{OFF}$, the pair of ports 416, 418 are closed (i.e., disconnected from each other).

Similar to the load reaction section 410, the EMU switching section 420 is configured to be ON $E_{ON}$ (i.e., an electro-hydraulic steering enabling position $E_{ON}$) or OFF $E_{OFF}$ (i.e., an electro-hydraulic steering disabling position $E_{OFF}$) depending on whether the operator desires to use the EMU circuit 300. In the OFF state $E_{OFF}$ of the EMU switching section 420, the valve system 400 prevents the source 110 from supplying hydraulic fluid to the EMU circuit 300 (i.e., prevents operation of the vehicle 10 with the EMU circuit 300). Conversely, in the ON state $E_{ON}$ of the EMU switching section 420, the valve system 400 allows hydraulic fluid to flow from the source 110 through the valve system 400 and to one or more steering valves 310. With the EMU switching section 420 in the ON state $E_{ON}$, the EMU circuit 300 may operate as needed to actuate the cylinder 140.

The EMU switching section 420 includes a first pair of ports 422, 422a-b. When the EMU switching section 420 is in the ON state $E_{ON}$, the valve system 400 forms a first connection between the first pair of ports 422a-b. With the first connection, the valve system 400 fluidly connects the source 110 to the EMU circuit 300 such that the EMU circuit 300 may operate the cylinder 140 with one or more steering valves 310. In some implementations, the EMU switching section 420 includes a second pair of ports 424, 424a-b. When the EMU switching section 420 is in the ON state $E_{ON}$, the valve system 400 forms a second connection between the second pair of ports 424a-b. For example, in FIGS. 3A and 3B, when the EMU switching section 420 is in the ON state $E_{ON}$, the first connection between the first pair of ports 422a-b fluidly connects the source 110 to the one or more steering valves 310 of the EMU circuit 300 and the second connection between the second pair of ports 424a-b fluidly connects the tank 120 to the one or more steering valves 310 of the EMU circuit 300. When the EMU switching section 420 is in the OFF state $E_{OFF}$, the ports 422, 424 are disconnected. For instance, in FIGS. 3A and 3B, the ports 422, 242 are closed.

FIGS. 3A and 3B illustrate the valve system 400 as a single valve proportional spool valve. As a proportional spool valve, the valve system 400 may have three positions P, $P_{1-3}$. With three positions $P_{1-3}$, each position P of the valve system 400 includes a load reaction section 410 and an EMU switching section 420. In the first position $P_1$ (shown as the default position in FIGS. 3A and 3B for the valve system 400), the EMU switching section 420 is OFF $E_{OFF}$ while the load reaction section 410 is ON $LR_{ON}$. This position keeps the EMU circuit 300 disabled while the HMU circuit 200 is able to receive the load reaction 402. In the second position $P_2$, both the load reaction section 410 and the EMU switching section 420 are in the ON state $LR_{ON}$, $E_{ON}$ (i.e., in a single position both sections 410, 420 are in the ON state $LR_{ON}$, $E_{ON}$). In other words, load reaction is enabled while the EMU circuit 300 also is enabled (i.e., capable of receiving hydraulic fluid from the source 110 to actuate the cylinder 140). In some implementations, this second position $P_2$ allows the EMU circuit 300 to augment hydraulic flow to the HMU circuit 200. For instance, in the event that the HMU circuit 200 is undersized and/or less competent (e.g., less expensive). Under the circumstances, the operator of the vehicle 10 may encounter a situation where the HMU circuit 200 is incapable of providing a sufficient quantity of hydraulic fluid to actuate the cylinder 140 at a desired rate. Here, the EMU circuit 300 may augment the HMU circuit 200 to achieve the desired rate of actuation for the cylinder 140. In the third position $P_3$, the EMU switching section 420 is ON $E_{ON}$ while the load reaction section 410 is OFF $LR_{OFF}$ such that the EMU circuit 300 may actuate the cylinder 140 without the operator receiving a load reaction 402 as a feedback.

The hydraulic system 100 of FIG. 3B is similar to that of FIG. 3A with a few exceptions. In FIG. 3B, unlike FIG. 3A, a solenoid (e.g., solenoid 404) directly operates the valve system 400 such that the solenoid energizes the valve system 400 to change between positions (e.g., instead of indirectly via a pilot operated solenoid valve 320). Moreover, in this configuration, solenoid(s) direction operate the steering valves 310a-b of the EMU circuit 300 instead of the pilot operated solenoid valves 320a-b. Additionally, with such solenoid actuation (e.g., directly), the hydraulic system 100 illustrated in FIG. 3B may not include the one or more relief valves 130 and/or the pilot tank 150.

FIGS. 3C-3F depict hydraulic systems 100 where the valve system 400 includes more than one valve. In other words, the functionality of the load reaction section 410 and the EMU switching section 420 occurs across multiple separate valves. In some implementations, as shown by FIGS. 3C and 3D, a first switch valve 430, 430a performs the functionality of the load reaction section 410 while a second switch valve 430, 430b performs the functionality of the EMU switching section 420. In these implementations, the first switch valve 430a and the second switch valve 430b are configured to operate independently (i.e., switch between the EMU enabled/disabled positions of the second switch valve 430b without enabling/disabling the load reaction positions of the first switch valve 430a). Here, each of the first switch valve 430a and the second switch valve 430b is a two-position valve. As two-position switch valves, each switch valve 430a-b has an ON position that enables the functionality of the switch valve 430 (e.g., enables the load reaction for the first switch valve 430a or enables the EMU circuit 300 with the second switch valve 430b) and an OFF position that disables the functionality of the switch valve 430 (e.g., disables the load reaction for the first switch valve 430a or disables the EMU circuit 300 with the second switch valve 430b). Much like the previously described valve systems 400, when a switch valve 430 is in the ON position, one or more pairs of ports (e.g., pairs 416, 418, 422, 424) for the switch valve 430 are connected to enable hydraulic fluid to flow across the switch valve 430. Conversely, when the switch valve 430 is in the OFF position, one or more pairs of ports (e.g., pairs 416, 418, 422, 424) for the switch valve 430 are disconnected and prevent the flow of hydraulic fluid across the switch valve 430.

With regard to FIGS. 3C and 3D, the first position $P_1$ is the OFF state for both switch valves 430a-b and the second position $P_2$ is the ON state for both switch valves 430a-b. Since each of these switch valves 430 may be switched between either position P by corresponding solenoids (e.g., direct solenoid actuation or pilot operated solenoid actuation), these switch valves 430 may be in any combination of ON/OFF and therefore provide similar functionality to the three position valve system 400 shown in FIGS. 3A and 3B. FIG. 3D is substantially similar to FIG. 3C except that the first switch valve 430a corresponding to the load reaction section 410 is not closed (e.g., it is open center) in the OFF state (i.e., the first position $P_1$). Rather than being closed, two ports (e.g., ports 416b, 418b) form a loop in the first position $P_1$ such that the first valve system line 412 and the second valve system line 414 are fluidly connected when the first switch valve 430 is in the OFF state. This looped fluid connection in the OFF state between the first valve system line 412 and the second valve system line 414 may allow the first switch valve 430a to quickly form a load reaction feedback connection in the second position $P_2$ because hydraulic fluid is already flowing through the loop in the first position $P_1$. In other words, the uninterrupted flow of the open loop may allow load reaction to occur with minimal delay as load reaction is enabled by switching the switch valve 430a to the second position $P_2$.

Referring to FIG. 3E, although the valve system 400 includes multiple separate valves (shown as two switch valves 430a-b), an actuation valve 440 of the valve system 400 may actuate the switch valves 430 together. Here, the actuation valve 440 is shown as a pilot-operated solenoid valve. Since the first switch valve 430a that is responsible for the load reaction section 410 is tied to the second switch valve 430b that is responsible for the EMU switching section 420, when the EMU circuit is enabled (i.e., the second switch valve 430b is in the second position $P_2$), the first switch valve 430a is switched to the first position $P_1$ and the load reaction 402 is disabled. In other words, here, unlike the designs of FIGS. 3A and 3B, the valve system 400 is not configured to augment flow from the EMU circuit 300 to the HMU circuit 200.

FIG. 3F is similar in design to the hydraulic system 100 of FIG. 3E in that the first switch valve 430a is tied to the second switch valve 430b. Yet here, rather than including the actuation valve 440 for the valve system 400, a signal line 450 actuates the first switch valve 430a. More specifically, the second switch valve 430b that enables/disables the EMU circuit 300 provides a pressure through port 424a to the signal line 450 when the second switch valve 430b is in the second position $P_2$; enabling the EMU circuit 300. With the pressure, the signal line 450 actuates the first switch valve 430a such that the first switch valve 430a moves to the first position $P_1$ where the load reaction is OFF $LR_{OFF}$ (disabled). Therefore, much like the configuration of FIG. 3E, the valve system 400 shown in FIG. 3F is not configured to augment flow from the EMU circuit 300 to the HMU circuit 200 because the load reaction section 410 and the EMU switching section 420 cannot simultaneously be in the ON state $LR_{ON}$, $E_{ON}$.

Referring to FIG. 3G, the valve system 400 is a single two-position valve. Here, the two positions $P_{1-2}$ of a single valve inherently tie together the functionality of the load reaction section 410 and the EMU switching section 420. When the valve system 400 is in the first position $P_1$, the EMU switching section 420 is disabled (e.g., one or more pairs of ports 422, 424 are disconnected) while the load reaction section 410 is enabled (e.g., one or more pairs of ports 416, 418 are fluidly connected). When the single valve of the valve system 400 switches to the second position $P_2$, the EMU section 420 is enabled (e.g., one or more pairs of ports 422, 424 are fluidly connected) while the load reaction section 410 is disabled (e.g., one or more pairs of ports 416, 418 are disconnected). As a two-position valve, the valve system 400 of FIG. 3G is not configured to augment flow from the EMU circuit 300 to the HMU circuit 200 because the load reaction section 410 and the EMU switching section 420 cannot simultaneously be in the ON state $LR_{ON}$, $E_{ON}$. In other words, FIG. 3G illustrates a potential single valve alternative to the valve systems 400 of FIGS. 3E and 3F.

Each of the valves described herein (e.g., steering valves 210, 310, relief valves 130, 230, pilot solenoid valves 320, valve system 400, switch valves 430, and actuation valves 440) may switch positions based on actuators associated with the valves. These actuators may be combinations of electronical (e.g., solenoids) or mechanical (e.g., pilot pressure lines and springs). Generally, hydraulic schematics, such as FIGS. 2 and 3A-3G, illustrate the actuators at one or both ends of a respective valve. For example, the pilot solenoid valves 320 (320a, 320b) include solenoid actuators that receive an electrical signal to activate each pilot valve 320 to change positions P. In other examples, mechanical means such as spring tension or hydraulic pilot pressure (e.g., via hydraulic signal lines) may maintain a valve in a position P or actuate a valve to change positions P. Moreover, each valve may have one or more positions P designated by a block (e.g., two blocks corresponds to two positions and three blocks corresponds to three positions). At each position, the schematics of FIGS. 2 and 3A-3G show the ports within the positions and indicate the open flow of the hydraulic fluid by arrows between ports or the lack of flow at a port by a closed "T" symbol. More specifically, although the schematic representations show proportional spool valves with generally three-positions, proportional spool valves may be represented with infinite positions between zero to one-hundred percent stroke of the valve. In other words, the two-position or three-position proportional spool valves illustrate a simplified version. Generally, spool valves move against a restoring force of a spring and often are configured with solenoids, force motors, or indirect solenoids (e.g., via the pilot solenoid valves 320) to ensure a predicable movement between positions that overcomes the restoring force. Hydraulic schematics, such as FIGS. 2 and 3A-3G typically depict proportional spool valves with bars above and below the valve to designate that the proportional spool valve moves within a sleeve. In some implementations, a transformer (e.g., a linear variable differential transformer (LVDT)) measures a position of the proportional spool valve within the sleeve.

A number of implementations have been described. Nevertheless, it will be understood that various modifications may be made without departing from the spirit and scope of the disclosure. Accordingly, other implementations are within the scope of the following claims.

What is claimed is:

1. A valve comprising:
a first pair of ports;
a second pair of ports;
a first connection between the first pair of ports when the valve is in a load reaction-enabling state, the first connection transmitting a load reaction from a load at a steering actuator to a steering device of a hydrostatic steering circuit; and
a second connection between the second pair of ports when the valve is in an electro-hydraulic steering-enabling state, wherein the second connection fluidly connects a fluid source to an electro-hydraulic steering circuit.

2. The valve of claim 1, wherein the electro-hydraulic steering circuit is in a parallel fluid connection with the hydrostatic steering circuit.

3. The valve of claim 1, wherein the first connection and the second connection occur at a single position.

4. The valve of claim 1, wherein, in the load reaction-enabling state, the second connection between the second pair of ports is disconnected.

5. The valve of claim 1, wherein the valve switches to the load reaction-enabling state and the electro-hydraulic steering-enabling state by actuation from a solenoid.

6. The valve of claim 5, wherein the solenoid is a pilot-operated solenoid.

7. The valve of claim 1, further comprising:
a third pair of ports, wherein, in the load reaction-enabling state, the first connection between the first pair of ports fluidly connects to a first port of the steering actuator; and
a third connection between the third pair of ports when the valve is in the load reaction-enabling state, wherein the third connection fluidly connects to a second port of the steering actuator, and wherein the second port of the steering actuator is located at an end of the steering actuator opposite the first port of the steering actuator.

8. The valve of claim 7, further comprising:
a fourth pair of ports, wherein in the electro-hydraulic steering enabling state, the second connection between the second pair of ports fluidly connects to a first steering valve of the electro-hydraulic steering circuit, and wherein the first steering valve fluidly connects to the first port of the steering actuator; and
a fourth connection between the fourth pair of ports when the valve is in the electro-hydraulic steering enabling state, wherein the fourth connection fluidly connects to a second steering valve of the electro-hydraulic steering circuit, and wherein the second steering valve is fluidly connected to the second port of the steering actuator.

9. The valve of claim 1, further comprising three valve positions:
in a first valve position of the three valve positions, the valve is in a load reaction-enabling state and the second connection between the second pair of ports is disconnected;
in a second valve position of the three valve positions, the valve is in the load reaction-enabling state and the electro-hydraulic steering-enabling state; and
in a third valve position of the three valve positions, the first connection between the first pair of ports is disconnected and the valve is in the electro-hydraulic steering-enabling state.

10. The valve of claim 1, wherein, in the load reaction-enabling state, the first connection of the first pair of ports directly connects to an outlet of a fluid metering unit of the hydrostatic steering circuit.

11. The valve of claim 1, wherein the valve is a proportional spool valve.

12. A valve system comprising:
a load reaction section and an electro-hydraulic steering switching section,
wherein the load reaction section includes a first pair of ports, a reaction-enabling state, and a reaction-disabling state,
wherein the reaction-enabling state includes a first connection fluidly connecting the first pair of ports to a steering actuator and a hydrostatic steering circuit, wherein the first connection transmits a load reaction from a load at the steering actuator to a steering device of the hydrostatic steering circuit, and wherein the reaction-disabling state disconnects the first connection for the first pair of ports, and wherein the electro-hydraulic steering switching section includes a second pair of ports, an electro-hydraulic steering enabling state, and an electro-hydraulic steering disabling state, wherein the electro-hydraulic steering enabling state includes a second connection fluidly connecting the second pair of ports from a fluid source to an electro-hydraulic steering circuit, and wherein the electro-hydraulic steering disabling state disconnects the second connection for the second pair of ports.

13. The valve system of claim 12, wherein the first connection fluidly connects the first pair of ports to the steering actuator and to a metering device of the hydrostatic steering circuit.

14. The valve system of claim 12, wherein the load reaction section corresponds to a first valve and the electro-hydraulic steering switching section corresponds to a second valve.

15. The valve system of claim 12, wherein the load reaction section and the electro-hydraulic steering switching section operate independently.

16. The valve system of claim 12, wherein the electro-hydraulic steering circuit is in a parallel fluid connection with the hydrostatic steering circuit.

17. The valve system of claim 12, wherein the load reaction section further comprises:
a third pair of ports, wherein, in the reaction-enabling state, the first connection between the first pair of ports fluidly connects to a first port of the steering actuator; and
a third connection between the third pair of ports when the valve is in the reaction-enabling state, wherein the third connection fluidly connects to a second port of the steering actuator, and wherein the second port of the steering actuator is located at an end of the steering actuator opposite the first port of the steering actuator.

18. The valve system of claim 17, wherein the electro-hydraulic steering switching section further comprises:
a fourth pair of ports, wherein in the electro-hydraulic steering enabling state, the second connection between the second pair of ports fluidly connects to a first steering valve of the electro-hydraulic steering circuit, and wherein the first steering valve fluidly connects to the first port of the steering actuator; and
a fourth connection between the fourth pair of ports when the valve is in the electro-hydraulic steering enabling state, wherein the fourth connection fluidly connects to a second steering valve of the electro-hydraulic steering circuit, and wherein the second steering valve is fluidly connected to the second port of the steering actuator.

19. The valve system of claim 12, wherein, in the reaction-enabling state, the first connection of the first pair of ports directly connects to an outlet of a fluid metering unit of the hydrostatic steering circuit.

20. The valve system of claim 12, wherein actuation of the electro-hydraulic steering switching section to the electro-hydraulic steering enabling state actuates the load reaction section to the reaction-disabling state.

21. The valve system of claim 12, further comprising a single valve that includes the load reaction section and the electro-hydraulic steering switching section.

22. The valve system of claim 21, wherein the reaction-enabling state and the electro-hydraulic steering disabling state occurs in a single position.

23. The valve system of claim 22, wherein the first connection fluidly connects the first pair of ports to the steering actuator and a metering device of the hydrostatic steering circuit.

24. A hydraulic system comprising:
a steering actuator;
a source supplying hydraulic fluid to the hydraulic system;
a hydrostatic steering circuit fluidly connected to the source, the hydrostatic steering circuit including a fluid meter and a steering valve, the steering valve including steering positions coupling the steering actuator and the fluid meter;
an electro-hydraulic steering circuit in parallel fluid communication with the hydrostatic steering circuit; and
a valve system fluidly communicating between the steering actuator, the hydrostatic steering circuit, and the electro-hydraulic steering circuit, wherein the valve system including a load reaction section and an electro-hydraulic steering switching section, wherein the load reaction section is configured to transmit a load reaction from a load at the steering actuator to the hydrostatic steering circuit through a load-reaction connection to the fluid meter of the hydrostatic steering circuit, the load reaction section and the steering valve in parallel fluid connection between the steering actuator and the fluid meter, and wherein the electro-hydraulic steering switching section is configured to enable and to disable fluid flow to the electro-hydraulic steering circuit.

25. The hydraulic system of claim 24, wherein the load reaction section further comprises:
a first pair of ports;
a reaction-enabling state including a first connection fluidly connecting the first pair of ports to the steering actuator and the hydrostatic steering circuit, the first connection transmitting the load reaction from the load at the steering actuator to a steering device of the hydrostatic steering circuit; and
a reaction-disabling state disconnecting the first connection for the first pair of ports.

26. The hydraulic system of claim 25 wherein the electro-hydraulic steering switching section further comprises:
a second pair of ports;
an electro-hydraulic steering enabling state including a second connection fluidly connecting the second pair of ports from the source to the electro-hydraulic steering circuit; and
a electro-hydraulic steering disabling state disconnecting the second connection for the second pair of ports.

27. The hydraulic system of claim 26, wherein the load reaction section further comprises:
a third pair of ports wherein, in the reaction-enabling state, the first connection of the first pair of ports fluidly connects to a first port of the steering actuator; and
a third connection between the third pair of ports when the valve is in the reaction enabling state, wherein the third connection fluidly connects to a second port of the steering actuator, and wherein the second port of the steering actuator is located at an end of the steering actuator opposite the first port of the steering actuator.

28. The hydraulic system of claim 27, wherein the electro-hydraulic steering switching section further comprises:
- a fourth pair of ports, wherein, in the electro-hydraulic steering enabling state, the second connection of the second pair of ports fluidly connects to a first steering valve of the electro-hydraulic steering circuit, the first steering valve fluidly connected to the first port of the steering actuator; and
- a fourth connection between the fourth pair of ports when the valve system is in the electro-hydraulic steering enabling state, wherein the fourth connection fluidly connects to a second steering valve of the electro-hydraulic steering circuit, and wherein the second steering valve fluidly connects to the second port of the steering actuator.

29. The hydraulic system of claim 26, wherein actuation of the electro-hydraulic steering switching section to the electro-hydraulic steering enabling state actuates the load reaction section to the reaction-disabling state.

30. The hydraulic system of claim 26, wherein the reaction-enabling state and the electro-hydraulic steering disabling state occurs in a single position.

31. The hydraulic system of claim 24, wherein the valve system comprises a single valve including the load reaction section and the electro-hydraulic steering switching section.

32. The hydraulic system of claim 24, wherein the load reaction section corresponds to a first valve and the electro-hydraulic steering switching section corresponds to a second valve.

33. The hydraulic system of claim 24, wherein the load reaction section and the electro-hydraulic steering switching section operate independently.

* * * * *